US012688261B1

(12) United States Patent
Rodriguez et al.

(10) Patent No.: US 12,688,261 B1
(45) Date of Patent: Jul. 21, 2026

(54) METHODS AND SYSTEMS FOR AUTHORIZING INVOCATION OF A TOOL BY AN AUTONOMOUS ARTIFICIAL INTELLIGENCE AGENT

(71) Applicant: Daon Technology, Douglas (IM)

(72) Inventors: Raphael A. Rodriguez, Marco Island, FL (US); Thomas Grissen, Naples, FL (US)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 19/552,620

(22) Filed: Feb. 27, 2026

(51) Int. Cl.
| | |
|---|---|
| *G06F 21/10* | (2013.01) |
| *G06F 21/60* | (2013.01) |
| *H04L 9/32* | (2006.01) |
| *H04W 12/08* | (2021.01) |

(52) U.S. Cl.
CPC .......... *G06F 21/101* (2023.08); *G06F 21/604* (2013.01); *H04L 9/3213* (2013.01); *H04W 12/08* (2013.01)

(58) Field of Classification Search
CPC .... G06F 21/101; G06F 21/604; H04W 12/08; H04L 9/3213
USPC .......................................................... 726/1
See application file for complete search history.

(56) References Cited

U.S. PATENT DOCUMENTS

| | | | |
|---|---|---|---|
| 12,483,411 B1 | 11/2025 | Chen | |
| 2019/0306315 A1 | 10/2019 | Portman et al. | |

| | | | | |
|---|---|---|---|---|
| 2020/0186515 A1* | 6/2020 | Bansal | ................. | G06F 9/5027 |
| 2021/0203661 A1* | 7/2021 | Sankey | ................. | H04L 9/3247 |
| 2022/0094709 A1 | 3/2022 | Sharma et al. | | |
| 2023/0075065 A1 | 3/2023 | Invenso et al. | | |
| 2023/0376961 A1 | 11/2023 | Nair et al. | | |
| 2024/0144082 A1 | 5/2024 | Tarapov et al. | | |
| 2025/0045413 A1 | 2/2025 | Sahin et al. | | |
| 2025/0077950 A1 | 3/2025 | David et al. | | |
| 2025/0125962 A1* | 4/2025 | Mahoney | ................ | G06F 9/547 |
| 2025/0165296 A1* | 5/2025 | Hwang | ................ | G06F 9/5027 |
| 2025/0209157 A1 | 6/2025 | Neuhof et al. | | |
| 2025/0217673 A1 | 7/2025 | Silver et al. | | |
| 2025/0247454 A1 | 7/2025 | Bliner et al. | | |
| 2025/0259085 A1 | 8/2025 | Crabtree et al. | | |
| 2025/0365323 A1 | 11/2025 | Sohum et al. | | |

* cited by examiner

*Primary Examiner* — Thanh T Le
(74) *Attorney, Agent, or Firm* — Kevin McDermott, Esq.

(57) ABSTRACT

A method for authorizing invocation of a tool by an autonomous artificial intelligence (AI) agent includes receiving, by an electronic device, a request from an autonomous AI agent operating in the electronic device. The request is for invoking a tool associated with a protected resource. Moreover, the method includes obtaining a fidelity signal indicative of whether the autonomous AI agent is behaviorally bound to the person, and obtaining an integrity signal indicative of whether execution behavior of the autonomous AI agent is within a range expected for using the requested tool. Furthermore, the method includes determining whether the request satisfies policy rules based on at least one of the fidelity signal, the integrity signal and a context associated with the request. When the request satisfies the policy rules, a delegation artifact is generated and the tool invocation request is effected based on the delegation artifact.

20 Claims, 4 Drawing Sheets

100

10

40

64

52

68

66

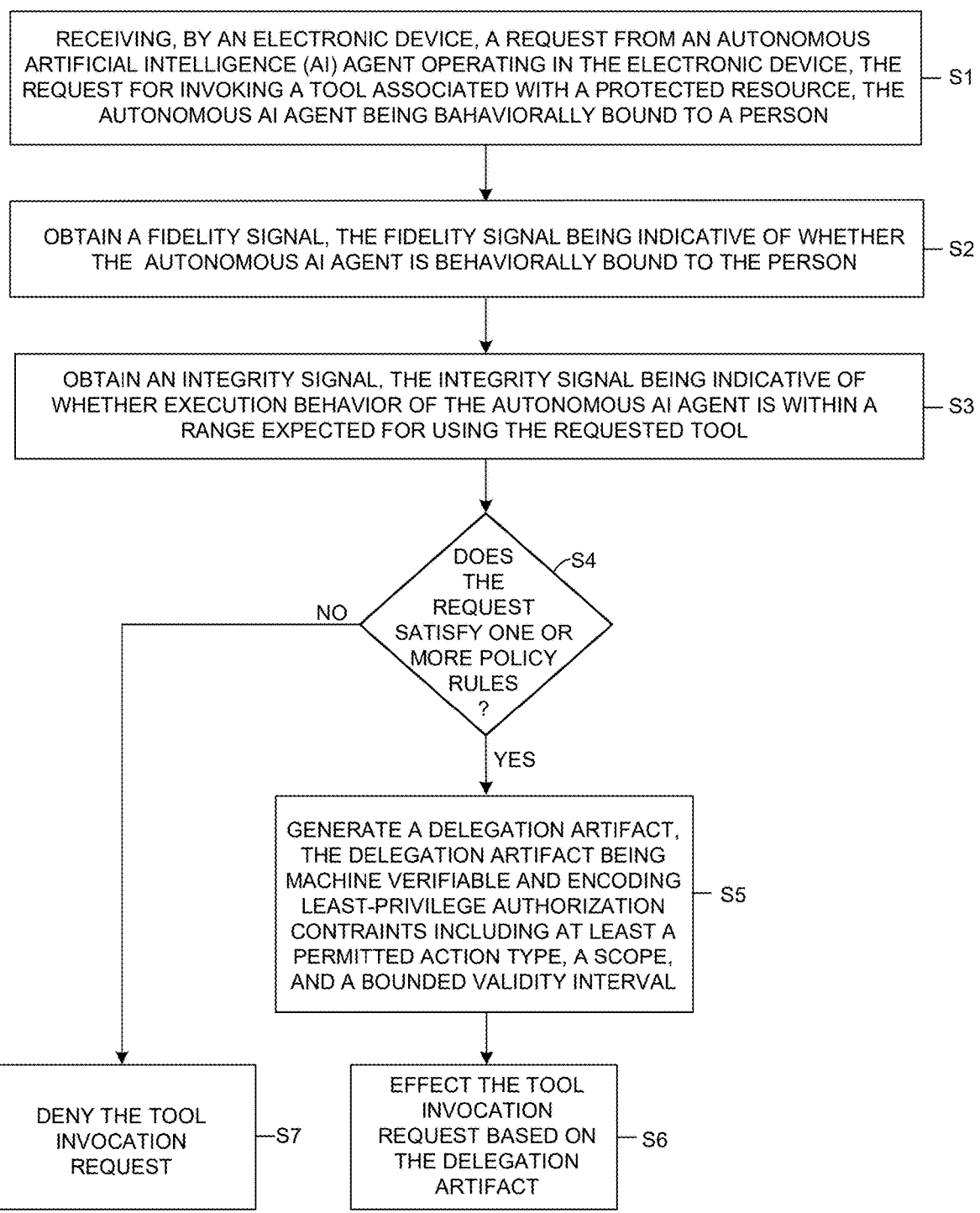

RECEIVING, BY AN ELECTRONIC DEVICE, A REQUEST FROM AN AUTONOMOUS ARTIFICIAL INTELLIGENCE (AI) AGENT OPERATING IN THE ELECTRONIC DEVICE, THE REQUEST FOR INVOKING A TOOL ASSOCIATED WITH A PROTECTED RESOURCE, THE AUTONOMOUS AI AGENT BEING BAHAVIORALLY BOUND TO A PERSON — S1

OBTAIN A FIDELITY SIGNAL, THE FIDELITY SIGNAL BEING INDICATIVE OF WHETHER THE AUTONOMOUS AI AGENT IS BEHAVIORALLY BOUND TO THE PERSON — S2

OBTAIN AN INTEGRITY SIGNAL, THE INTEGRITY SIGNAL BEING INDICATIVE OF WHETHER EXECUTION BEHAVIOR OF THE AUTONOMOUS AI AGENT IS WITHIN A RANGE EXPECTED FOR USING THE REQUESTED TOOL — S3

DOES THE REQUEST SATISFY ONE OR MORE POLICY RULES ? S4

NO

YES

GENERATE A DELEGATION ARTIFACT, THE DELEGATION ARTIFACT BEING MACHINE VERIFIABLE AND ENCODING LEAST-PRIVILEGE AUTHORIZATION CONTRAINTS INCLUDING AT LEAST A PERMITTED ACTION TYPE, A SCOPE, AND A BOUNDED VALIDITY INTERVAL — S5

DENY THE TOOL INVOCATION REQUEST — S7

EFFECT THE TOOL INVOCATION REQUEST BASED ON THE DELEGATION ARTIFACT — S6

FIG. 6

METHODS AND SYSTEMS FOR AUTHORIZING INVOCATION OF A TOOL BY AN AUTONOMOUS ARTIFICIAL INTELLIGENCE AGENT

BACKGROUND OF THE INVENTION

This invention relates generally to artificial intelligence based digital assistants, and more specifically to methods and systems for authorizing invocation of a tool by an autonomous artificial intelligence agent.

Computer systems commonly rely on identity and access management (IAM) controls to authenticate people and to authorize them to access protected resources. Traditional IAM controls were designed principally for people who authenticate via credentials, multi-factor authentication, and/or biometric signals, and who then receive a token or other authorization artifact enabling access to the protected resources for a period of time. These approaches often assume that a person remains the acting principal while the protected resources are being accessed, and the set of actions performed while accessing the resources will be limited by human speed, attention, and operational constraints.

In parallel, software automation has increasingly used artifacts like non-human identities, Internet of things (IoT) services, service accounts, and machine-to-machine tokens to enable programmatic access to resources. Such artifacts are typically provisioned and governed through static permissions, fixed scopes, and predetermined lifetimes. However, using such artifacts to enable programmatic access to protected resources has been known to result in over-privileged, difficult to right-size, and slow to adapt to dynamic risk conditions, resulting in standing privileges that may be abused if compromised.

Autonomous artificial intelligence agents introduce a fundamentally different operational profile. An artificial intelligence agent may be configured to plan, decide, and execute actions with limited human supervision, including invoking tools and external services to complete tasks. Such agents may operate at speeds and scales that exceed human capabilities, may initiate parallel action sequences, and may dynamically alter plans based on intermediate tool outputs or even instant code creation and manipulation, to gain access to systems and services. As a result, compromise or manipulation of an agent can enable rapid and high-impact abuse of protected resources.

Artificial intelligence agents are typically bound to a certain person and act on behalf of that person. However, it is known that artificial intelligence agents can be subverted such that the agent is no longer reliably acting on behalf of the person. For example, interception, replay, impersonation, account takeover, session hijacking, or other adversarial influence can cause the agent to diverge from the behavioral patterns of the person to whom it is bound. It is also known that an artificial agent's execution behavior may become abnormal or adversarial even if the agent remains bound to the person. For example, prompt injection, tool output manipulation, tampering with tool invocation sequences, unauthorized expansion of resource scope, or malicious automation routines can cause the agent to perform unsafe or unauthorized tool calls.

Known approaches can attempt to mitigate risks associated with AI Agents being subverted and otherwise malfunctioning by applying authentication at the beginning of a session, constraining tool access through static scopes and permissions, or requiring additional step-up authentication for selected sensitive actions. However, such approaches may not be adequate for agentic operation because a single authentication event does not continuously reflect whether the agent remains faithfully bound to the person over time, static permissioning does not adapt to rapidly changing risk conditions or evolving agent plans, and step-up prompts can be bypassed, delayed, or become operationally impractical when an agent executes many actions across multiple systems singularly or simultaneously.

Thus, it would be advantageous and an improvement over the relevant technology to provide a method, an electronic device and a computer readable recording medium capable of reliably and efficiently enforcing least-privilege action constraints of autonomous artificial intelligence agents while maintaining trust in both the person-agent bond and the integrity of the execution behavior of the artificial intelligence agent.

BRIEF DESCRIPTION OF THE INVENTION

An aspect of the present disclosure provides a method for authorizing invocation of a tool by an autonomous artificial intelligence agent that includes the steps of receiving, by an electronic device, a request from an autonomous artificial intelligence agent operating in the electronic device. The request is for invoking a tool associated with a protected resource. The autonomous artificial intelligence agent being behaviorally bound to a person. Moreover, the method includes obtaining a fidelity signal indicative of whether the autonomous artificial intelligence agent is behaviorally bound to the person and obtaining an integrity signal indicative of whether execution behavior of the autonomous artificial intelligence agent is within a range expected for using the requested tool.

The method also includes determining whether the request satisfies one or more policy rules at an authorization checkpoint based on at least one of the fidelity signal, the integrity signal, and a context associated with the request. In response to determining that the request satisfies the one or more policy rules, the method includes generating a delegation artifact. The delegation artifact is machine-verifiable and encodes least-privilege authorization constraints including at least a permitted action type, a scope, and a bounded validity interval. Finally, the method includes effecting the tool invocation request based on the delegation artifact.

In an embodiment of the present disclosure the determining step includes determining the fidelity signal indicates that the autonomous artificial intelligence agent is behaviorally bound to the person, determining the integrity signal indicates the execution behavior of the autonomous artificial intelligence agent is within the expected range, and determining the context of the request by determining at least one of a tool identifier, an action type, a resource identifier, a requested scope, a session nonce, and an execution context.

In another embodiment of the present disclosure the scope includes at least one of a tool scope, an application programming interface endpoint scope, a function scope, a resource scope, a tenant scope, an object scope, and an account scope.

In yet another embodiment of the present disclosure the least-privilege authorization constraints further include at least one of a rate limit, a concurrency limit, a maximum number of invocations, a maximum data access volume, a transaction constraint, and a side-effect limit.

In yet another embodiment of the present disclosure, the bounded validity interval includes a time-to-live that is less than a session duration of the autonomous artificial intelligence agent, and the method further includes issuing the delegation artifact per tool invocation or per short authorization window.

In yet another embodiment of the present disclosure, in response to determining that the request fails to satisfy the one or more policy rules, denying the request, or generating a constrained delegation artifact that reduces at least one of the permitted action type, the scope, or the bounded validity interval relative to the request.

In yet another embodiment of the present disclosure the method further includes cryptographically binding the delegation artifact to an execution context of the autonomous artificial intelligence agent.

In yet another embodiment of the present disclosure, the delegation artifact includes a hash or digital signature derived from attestation evidence of a runtime environment executing the autonomous artificial intelligence agent.

In yet another embodiment of the present disclosure the delegation artifact includes a nonce, challenge-response value, or session-bound value associated with at least one of the request or the intended person to prevent replay of the delegation artifact.

Another aspect of the present disclosure provides a non-transitory computer-readable recording medium in an electronic device for authorizing invocation of a tool by an autonomous artificial intelligence agent. The non-transitory computer-readable recording medium stores instructions which when executed by a hardware processor causes the hardware processor to perform the steps of the methods described above.

Yet another aspect of the present disclosure provides an electronic device for authorizing invocation of a tool by an autonomous artificial intelligence agent. The electronic device includes a processor and a memory configured to store data. The electronic device is associated with a network and the memory is in communication with the processor and has instructions stored thereon which, when read and executed by the processor, cause the electronic device to receive a request from an autonomous artificial intelligence agent operating in the electronic device. The request is for invoking a tool associated with a protected resource and the autonomous artificial intelligence agent is behaviorally bound to a person. The instructions which when read and executed by the processor, further cause the electronic device to obtain a fidelity signal indicative of whether the autonomous artificial intelligence agent is behaviorally bound to the person, and obtain an integrity signal indicative of whether execution behavior of the autonomous artificial intelligence agent is within a range expected for using the requested tool.

Moreover, the instructions which when read and executed by the processor, further cause the electronic device to determine whether the request satisfies one or more policy rules at an authorization checkpoint based on at least one of the fidelity signal, the integrity signal and a context associated with the request. In response to determining the request satisfies the one or more policy rules, a delegation artifact is generated. The delegation artifact is machine-verifiable and encodes least-privilege authorization constraints including at least a permitted action type, a scope, and a bounded validity interval. The tool invocation request is effected based on the delegation artifact.

In an embodiment of the present disclosure the instructions when read and executed by the processor, further cause the electronic device to determine the fidelity signal indicates that the autonomous artificial intelligence agent is behaviorally bound to the person, determine the integrity signal indicates the execution behavior of the autonomous artificial intelligence agent is within the expected range, and determine the context of the request by determining at least one of a tool identifier, an action type, a resource identifier, a requested scope, a session nonce, and an execution context.

In another embodiment of the present disclosure the scope includes at least one of a tool scope, an application programming interface endpoint scope, a function scope, a resource scope, a tenant scope, an object scope, and an account scope.

In yet another embodiment of the present disclosure the least-privilege authorization constraints further include at least one of a rate limit, a concurrency limit, a maximum number of invocations, a maximum data access volume, a transaction constraint, and a side-effect limit.

In yet another embodiment of the present disclosure, wherein the bounded validity interval comprises a time-to-live that is less than a session duration of the autonomous artificial intelligence agent, the instructions when read and executed by the processor, further cause the electronic device to issue the delegation artifact per tool invocation or per short authorization window.

In yet another embodiment of the present disclosure, the instructions when read and executed by the processor, in response to determining that the request fails to satisfy the one or more policy rules, further cause the electronic device to deny the request or generate a constrained delegation artifact that reduces at least one of the permitted action type, the scope, or the bounded validity interval relative to the request.

In yet another embodiment of the present disclosure the instructions when read and executed by the processor further cause the electronic device to cryptographically bind the delegation artifact to an execution context of the autonomous artificial intelligence agent.

In yet another embodiment of the present disclosure the instructions when read and executed by the processor further cause the electronic device to include, in the delegation artifact, a hash or digital signature derived from attestation evidence of a runtime environment executing the autonomous artificial intelligence agent.

In yet another embodiment of the present disclosure the instructions when read and executed by the processor further cause the electronic device to include, in the delegation artifact, a nonce, challenge-response value, or session-bound value associated with at least one of the request or the intended person to prevent replay of the delegation artifact.

BRIEF DESCRIPTION OF THE DRAWINGS

FIG. 6 is a diagram illustrating an example method and algorithm for authorizing invocation of a tool by an autonomous AI agent according to an embodiment of the present disclosure.

DETAILED DESCRIPTION OF THE INVENTION

Figure 1:
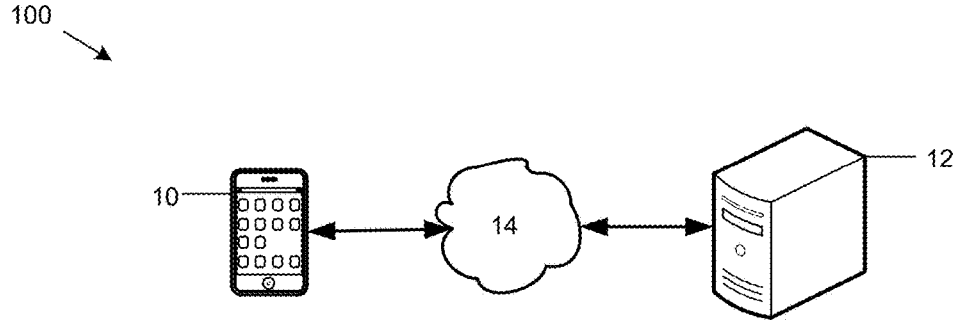
FIG. 1 is a schematic diagram of an example computing system for authorizing invocation of a tool by an autonomous artificial intelligence (AI) agent according to an embodiment of the present disclosure.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

As used herein, the following terms are intended to have the meanings set forth below. These definitions are non-limiting and are provided to improve clarity; other meanings consistent with the disclosure may also apply.

Side-effect limit as described herein refers to a constraint limiting externally observable and/or irreversible outcome of an action. Side-effect limits may include, for example, a maximum monetary transfer amount, a maximum number of records created/modified/deleted, a maximum number of messages sent, restrictions on destructive operations, restrictions on privilege-changing operations, maximum data export or exfiltration volume, restrictions on external destinations via allowlists/denylists, requirements for draft-only execution modes, and/or requirements for step-up approval prior to execution.

Capabilities of an AI Agent, as described herein, refer to operations the agent is technically able to perform. Permitted actions, as described herein, refer to a subset of capabilities authorized for a particular request, session, scope, and/or time window as determined by policy evaluation.

Execution context, as described herein, refers to runtime attributes describing where and how a particular autonomous AI agent instance executes at the time of authorization, including an identity of a workload or process and one or more runtime measurements. For example, execution context attributes may include a model identifier and/or model measurement, and may also include a container/VM/workload identity and software supply chain measurements. Examples of model identifiers and/or model measurements include, but are not limited to, a model version, model digest, or model-weights measurement.

Attestation evidence, as described herein, refers to cryptographic evidence used to prove one or more execution-context attributes. Examples of cryptographic evidence include, but are not limited to, signed measurements or quotes.

Request context, as described herein, includes one or more attributes associated with a tool invocation request, including, for example: a tool identifier; an action type; tool arguments; resource identifiers; requested scope; tenant identifiers; account identifiers; object identifiers; session identifiers; nonce/challenge-response values; timestamps;

execution-context attributes; and one or more risk, environmental, or policy-state signals. It is contemplated that execution-context attributes as described herein include attestation-derived values.

Machine-verifiable, as described herein, means verifiable using computerized verification logic, such as verification of a digital signature or message authentication code, validation of a bounded validity interval, and confirmation that encoded authorization constraints. Encoded authorization constraints include, for example, permitted actions and scope.

A delegation artifact, as described herein, includes a token, credential, capability, signed assertion, cryptographically protected data structure, or other machine-verifiable authorization object configured to be presented to a relying system to enable, deny, or constrain a tool invocation.

A protected resource, as described herein, includes any data, capability, service, system function, account, communication channel, or computing resource for which access, invocation, use, modification, transmission, or disclosure is subject to authorization, authentication, policy enforcement, or other access-control restrictions. Protected resources may be protected while stored, in transit, and/or during processing.

A tool, as described herein, includes a software function, API endpoint, command, plugin, connector, workflow step, or other callable operation that can access, modify, transmit, or otherwise affect a protected resource.

Obtain, obtaining, and similar terms, as described and/or used herein, include computing, deriving, receiving, retrieving, accessing, or otherwise acquiring information FIG. 1 is a schematic diagram of an example computing system 100 for authorizing invocation of a tool by an autonomous artificial intelligence (AI) agent according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. The electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who typically operates the device 10.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
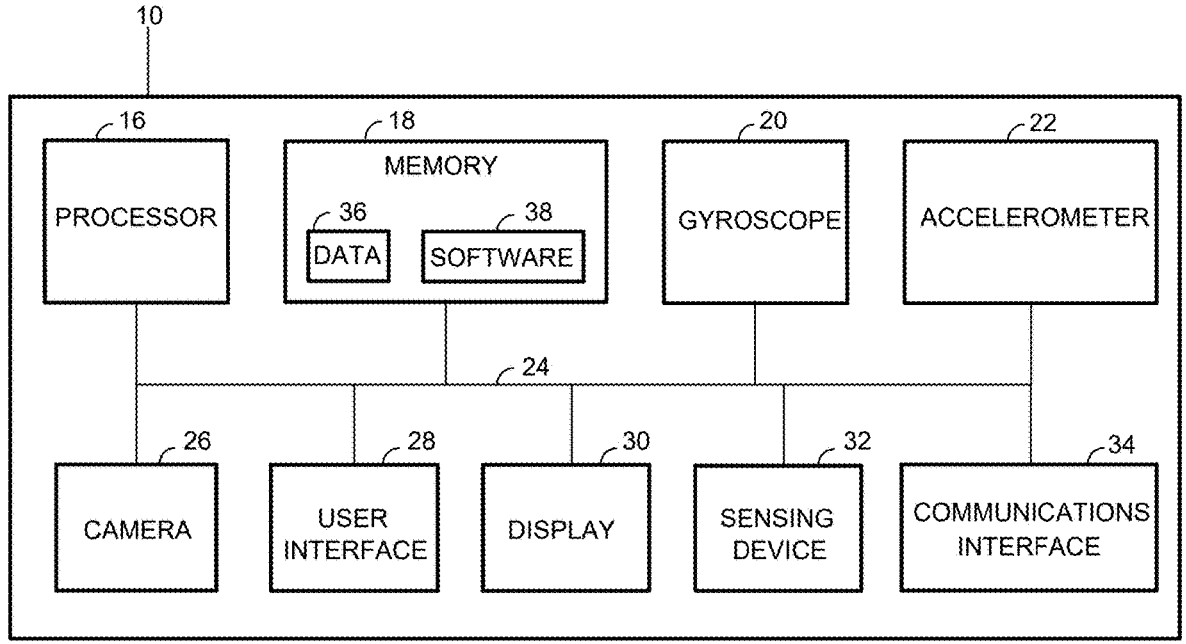
FIG. 2 is a more detailed schematic diagram illustrating an example electronic device in the system of FIG. 1.

FIG. 2 is a more detailed schematic diagram illustrating the example electronic device 10 used for authorizing invocation of a tool by an autonomous AI agent according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of people, data regarding an AI Agent's intrinsic execution behavior, execution signals, and data regarding an AI agent behavioral modality. Moreover, the memory 18 may be used to store, for example, capabilities and/or action types of AI Agents, a time-to-live for each capability and/or action type, similarity scores, threshold values, attestation conformity scores, integrity scores, fidelity scores, authorization check points, policies, decision outcomes, delegation artifacts, tool invocation requests, resource identifiers, credentials, tokens, agent similarity scores, agent similarity threshold values, account identifiers, tenant identifiers, object identifiers, profile scopes of people, constraints on AI Agents when executing a capability and/or action type, public and private keys, canonical decision objects, digests of tool invocation requests, scope summaries and risk bands, policy outputs, time stamps, metadata, digests of issued delegation artifacts, digests of denied delegation artifacts, trusted execution environment quotes or measurements, container image hashes, software bills of materials (SBOM), and a model-weights hash. Data stored in the memory 18 may be referred to as record data. For example, a fidelity score stored in the memory 18 may be referred to as a record fidelity score.

Data regarding an AI Agent's intrinsic execution behavior includes, but is not limited to, tool-invocation structure, call cadence, or resource access patterns. Data regarding the behavioral modality of an AI agent may include, but is not limited to, tool-invocation graphs, inter-call timing or burstiness statistics, resource scope descriptors, and output-plan embeddings. The behavioral modality of an AI agent can be used to construct a record AI agent similarity score which may also be stored in the memory 18.

Metadata includes, but is not limited to, timestamps and version numbers. The hash values are signed within a Hardware Security Module (HSM) (not shown) and written to a permissioned Immutable Ledger (not shown) to ensure tamper-evident lineage. An Immutable Ledger as described herein can be a tamper-evident data store or a permissioned blockchain, into which cryptographic hashes of snapshots, enrollment events, and policy updates are recorded. Additionally, or alternatively, the Immutable Ledger may be implemented using a distributed ledger based on Directed Acyclic Graph (DAG) structures, or a replicated, tamper-evident distributed database. Each ledger node may be operated by distinct organizational entities, for example, a compliance auditor or a security operations center to enhance trust.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein.

Application programs are software and include, but are not limited to, operating systems, Internet browser applications, machine learning algorithms (MLA), attestation verifiers, Hardware Security Modules (HSM), sandbox software programs, policy evaluation software, authorization software programs, fidelity signal software programs, integrity signal software programs, relying systems, rate limit software programs, and any special computer program that manages the relationship between application software and any suitable variety of hardware that helps to make-up a computer system or computing environment. The software may also include computer programs that implement buffers and use RAM to store temporary data.

Machine learning models have parameters which are modified during training to optimize functionality of the models trained using a machine learning algorithm (MLA).

Fidelity signal software obtains a fidelity signal indicating whether an autonomous AI agent is bound to an intended person. The fidelity signal may be any kind of data that can be used to indicate whether or not the AI Agent is bound to the person. For example, the fidelity signal may be a fidelity score. The fidelity signal may be derived from behavioral modality data, baseline persona modeling, and/or continuous evaluation techniques.

The integrity signal software obtains an integrity signal indicating whether an autonomous AI agent is behaving within an expected range while executing a capability. The integrity signal may be any kind of data that can be used to indicate whether or not an autonomous AI agent is behaving within an expected range while executing a capability. For example, the integrity signal may be an integrity score. The behavior can include, for example, evaluation of tool invocation patterns, resource scope changes, timing patterns, semantic alignment between plans and outputs, and/or other integrity signals.

The authorization software may generate a delegation artifact when an autonomous AI agent requests to invoke, for example, a tool or an Application Programming Interface (API). The authorization software may collect, for example, fidelity and integrity scores, and data regarding the context of the request, and environmental or risk factors associated with the request. Examples of environmental or risk factors include, for example, anomalous indicators in the network 14, malware signals, and compromised credential indicators. It is contemplated by the present disclosure that for higher-risk transactions, authorization checkpoints may be configured to require, for example, stricter constraints, shorter lifetimes and step-up approval. High-risk transactions include, for example, remotely accessing a bank account and conducting a stock trade, for example, worth more than ten thousand dollars.

Moreover, the authorization software may generate a canonical decision object for each invocation request. The canonical decision object may include, for example, a digest of tool invocation requests, score summaries and risk bands, policy outputs, a digest of issued delegation artifacts, a digest of denied delegation artifacts, a digest of issued delegation artifact timestamps, and signing metadata. The canonical decision objects may be cryptographically protected. For example, canonical decision objects may be hashed and digitally signed. Furthermore, the canonical decision objects may be stored in a tamper-evident audit log. The audit log may be implemented using append-only storage and/or integrity-protected logging mechanisms that are operationally acceptable in low-latency environments.

Capability as described herein includes operations an autonomous AI Agent is technically able to perform. The capabilities of an AI agent include, for example, functions, tools, APIs, operations, and model behaviors an AI Agent is able to invoke or perform. Each capability is implemented via a capability-specific credential that authorizes the capability or a closely related set of actions with limits. An example limit is the time-to-live (TTL) associated with the capability.

The TTL sets a certain period of time for a capability to be executed by the AI agent. The TTL binds a capability to time parameters, for example, a time the AI agent is permitted to execute the capability and a time the permission to execute the capability expires. For example, the AI agent may be permitted to invoke tools between 6:00 AM and 6:00 PM every day. When the TTL expires, the AI agent 46 is no longer permitted to execute the capability. Permissions may expire automatically. The TTL is not an inherent property of the capability itself. Rather, the TTL is policy type control over the capability. The TTL associated with a credential can be adjusted before it expires.

Down-scoping as described herein includes narrowing the scope of a capability. An example of down-scoping could be changing the individuals to whom an AI agent may send emails, for example, changing from being able to send emails to anyone to being able to send emails to a single email address. Alternatively, the ability to send emails may be changed from sending to anyone to draft only.

Sandbox software programs enforce reduced capabilities of AI Agents. Sandbox software may facilitate reducing the capabilities of the AI agent by, for example, eliminating one or more capabilities and limiting the scope of a capability. Limiting the scope of a capability may include, for example, permitting read-only actions but denying write actions.

The reduced capabilities imposed on an AI Agent by sandbox techniques may be removed when the integrity signal, or score, equals or exceeds a threshold value for intervals of time. The intervals of time may be of any duration, for example, five minutes, that facilitates determining an AI Agent is not compromised and can be trusted. The number of intervals may be any number that facilitates accurately determining that an AI Agent is not compromised, for example, three.

Policy-as-code is the use of code to represent policy where the policies are rules and conditions for access policies that determine when access is authorized. Policy evaluating software may evaluate policy-as-code at, for example, authorization checkpoints. Authorization checkpoints may occur at certain points in a procedure or at certain times. For example, authorization checkpoints may occur when an available tool is discovered, when a tool is selected, during authorization before an invocation, during run time execution, and during post invocation confirmation. The standards may be established by, for example, a government or business.

Rate-limit software programs can monitor inter-call bursts and determine if the number of inter-call bursts exceeds a burst threshold value. If so, the remaining time-of-life (TTL) may be reduced for an AI agent to conduct a capability. Additionally, when the number of inter-call bursts exceeds the burst threshold value the capabilities of the AI agent may be reduced via sandbox software programs. When the number of inter-call bursts repeatedly exceeds the burst threshold value, the person bound to the AI agent may need to reauthenticate or reauthenticate to a more rigorous standard.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either. The gyroscope 20 and accelerometers 22 may capture data for behavioral modalities such as, but not limited to, the gait of a person, swinging arms of a person, and other motion related activities.

The camera 26 captures image data. As used herein, capture means to record data temporarily or permanently, for example, multimedia data. The camera 26 can be one or more imaging devices configured to record images of identity documents of a user while utilizing the electronic device 10. Moreover, the camera 26 is capable of recording images under any lighting conditions including infrared light. The camera 26 may be integrated into the electronic device 10 as one or more front-facing cameras and/or one or more rear facing cameras that each incorporates a sensor, for example and without limitation, a CCD or CMOS sensor. Alternatively, the camera 26 can be external to the electronic device 10. The camera 26 may capture videos of a person moving.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers. The devices included in the interface 28 may collect multi-modal behavioral data that includes, for example, keystroke dynamic data, language-style embeddings, and voice-print feature data. A similarity score may be computed from the collected multi-modal behavioral data and compared against the Baseline Persona Model for the person.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed or information entered by a person can be captured and stored in the memory 18. The interface 28 may include adapters for chat platforms, web widgets, and mobile applications. Examples of chat platforms include, but are not limited to, Slack and Teams.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like, only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet™ or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across the network 14 between the electronic device 10 and any other device (not shown). The exchange of information may involve the transmission of radio frequency (RF) signals through an antenna (not shown).

The server 12 includes most of the same components as described herein with regard to the electronic device 10. However, because the server 12 is primarily stationary, not primarily mobile, the server 12 may not include the gyroscope 20 and/or the accelerometer 22.

As described herein, a protected resource includes any data, capability, service, system function, account, communication channel, or computing resource for which access, invocation, use, modification, transmission, or disclosure is subject to authorization, authentication, policy enforcement, or other access-control restrictions. Protected resources may be protected while stored, in transit, and/or during processing. Protected resources may reside on, be processed by, or be accessible through, for example, the electronic device 10 and the server 12. Additionally, or alternatively, the protected resources may reside on, be processed by, or be accessible through electronic devices (not shown), servers (not shown), storage systems (not shown), applications (not shown), databases (not shown), communication systems, or network services.

Figure 3:
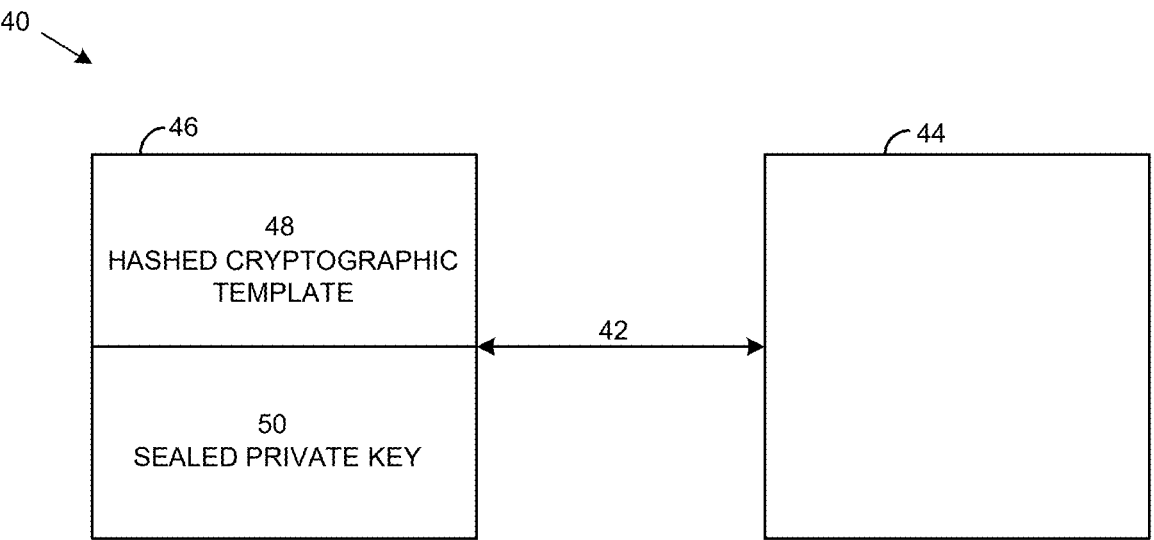
FIG. 3 is a simplified block diagram illustrating a bond between a person and an AI agent.

FIG. 3 is a simplified block diagram 40 illustrating a bond 42 between a person 44 that operates, for example, the electronic device 10 and an autonomous AI agent 46. The autonomous AI agent 46 includes a hashed cryptographic template 48 and a sealed private key 50. The hashed cryptographic template 48 may be created during an enrollment process as the result of conducting an authentication transaction with, for example, biometric modality data captured from the person. The biometric modalities may include, for example, finger, voice and face. After the person is successfully authenticated, a biometric template is created from the captured biometric modality data. The template is hashed to form the hashed cryptographic template 48. The hashed cryptographic template 48 may be stored in a trusted execution environment (TEE) in, for example, the processor 16 or may be stored in a Hardware Security Module (HSM) able to communicate with the electronic device 10 via the network 14. As described herein, the AI Agent 46 is a software entity configured to, for example, generate plans, select actions, and invoke tools or application programming interfaces (API).

Public/Private key cryptography may be used to create the bond 42 between the person 44 and the AI agent 46. More specifically, a public/private key pair can be created and the private key 50 can be stored, for example, within the TEE or in the HSM. The private key 50 is unlocked and able to be accessed when biometric data captured from an individual operating the electronic device 10 is successfully authenticated against the hashed cryptographic template 48. A successful authentication indicates that the individual operating the electronic device 10 is the person 44. The bond 42 is thus created between the person 44 and the AI agent 46. The person 44 is the human owner to whom the AI Agent 46 is bound. The captured biometric data may be, for example, face, finger, or any behavioral modality like keystroke dynamics.

The public key, the hashed cryptographic template 48, and associated metadata are written to an Immutable Ledger to create an auditable record that the AI Agent 46 is bound to the person 44. It is contemplated by the present disclosure that by virtue of binding the AI agent 46 to the person 44, the person 44 possesses exclusive rights over the credentials and models associated with the AI Agent 46. The credentials can include, for example, the hashed cryptographic template 48 and the sealed private key 50. The models can include, for example, a Baseline Persona Model and a snapshot of the Baseline Persona Model in an uncorrupted state. As described herein, sealed indicates that the private key 50 cannot be removed from the TEE, or the HSM, in encrypted form and can be unlocked upon a successful authentication transaction. Thus, the sealed private key 50 is a HSM/TEE protected key bound to the hashed cryptographic template 48.

It is contemplated by the present disclosure that the public/private key pair may be periodically replaced with a different public/private key pair. When the public/private key pair is replaced, the bond between the person 44 and the AI agent 46 is re-established as described herein with regard to FIG. 3.

Although the hashed cryptographic template 48 is created from biometric modality data as described herein, it is contemplated by the present disclosure that the hashed cryptographic template 48 may alternatively be created from any other type of security credential, for example, a pass phrase or a physical token.

The AI agent 46 does not include raw authentication data, for example, captured biometric modality data or pass phrases.

It is contemplated by the present disclosure that the AI agent 46 thus bonded to the person 44 is authorized to represent and execute behavioral data, preferences and actions of the person 44 on behalf of the person 44. That is, the AI agent 46 may execute capabilities on behalf of the person 44, for example, initiating payment up to a certain amount for a specific vendor. However, the private key 50 is to be unlocked before the AI agent 46 is permitted to conduct any transaction on behalf of the person 44. The private key 50 is unlocked and able to be accessed when biometric data captured from an individual operating the electronic device 10 is successfully authenticated against the hashed cryptographic template 48. A successful authentication indicates that the individual operating the electronic device 10 is the person 44.

Behavior of the AI agent 46 may be characterized using telemetry including, for example, tool-invocation graphs, inter-call timing statistics, resource-scope descriptors of accessed data and/or services, and output-plan embeddings generated by the AI agent 46.

Delegation artifacts may be, for example, tokens, credentials, capabilities, signed assertions, cryptographically protected data structures, or other machine-verifiable authorization objects that can be presented to a relying system to enable or constrain a permitted action, for example, tool invocation. It is contemplated by the present disclosure that delegation artifacts may be configured for validation by a relying system without requiring the relying system to compute underlying behavioral models, integrity scores, or other complex risk analyses. Relying systems include, for example, software-as-a-service (SaaS) applications, cloud control planes, internal microservices, financial transaction systems, healthcare portals, telecommunications service systems, or other protected services.

Figure 4:
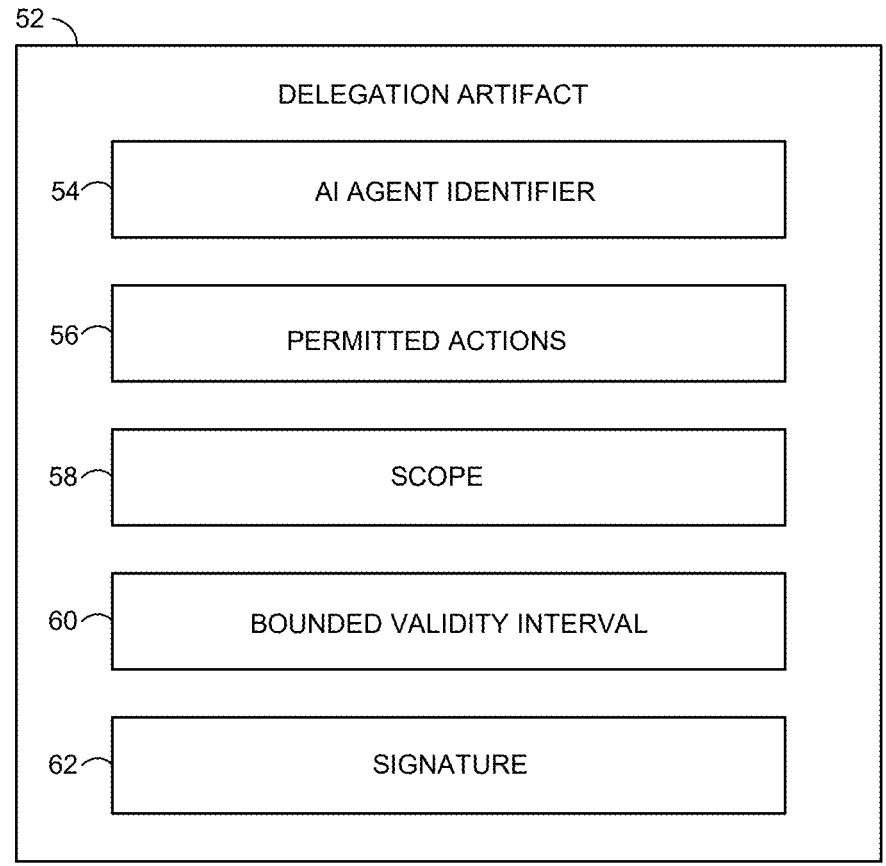
FIG. 4 is a diagram illustrating an example delegation artifact.

Delegation artifacts encode least-privilege permissions of the autonomous AI agent required to invoke, for example, a tool or Application Programming Interface (API). As described herein, least-privilege permissions are only those permissions necessary to perform a capability or permitted action, for example, requesting to invoke a tool FIG. 4 is a diagram illustrating an example delegation artifact 52. The delegation artifact 52 includes an autonomous agent identifier 54, permitted actions 56, a scope 58, a bounded validity interval 60, and a digital signature 62. The agent identifier 54 is data that identifies the AI Agent. The AI Agent identifier 54 may alternatively be, for example, a person identifier for a person requesting to invoke a tool or a session identifier.

The permitted actions 56 include a subset of capabilities that are authorized to be performed by the AI Agent for a particular request, session, scope, and/or time interval. The permitted actions can be determined by policy evaluation and associated risk signals. A session may be, for example, the operations conducted by the AI Agent to perform a capability or the operations conducted to determine whether an AI Agent invocation request should be granted or denied. Specific actions 56 that may be permitted to be performed by an AI Agent include, for example, executing read-only commands, transferring funds, changing account settings, creating a user, and deleting records. It is contemplated by the present disclosure that an AI Agent may possess capabilities that are not permitted for use during certain sessions.

The scope 58 can include, for example, a scope of the invoked tool, a resource scope, a tenant scope, an object scope, an account scope, permitted Application Programming Interface (API) endpoint scope, a function scope, and command categories. Resource scopes may include, for example, account identifiers, tenant identifiers, object identifiers, folder scopes, and customer profile scopes. The bounded validity interval 60 includes, for example, a time-to-live (TTL) and a not-before time. The digital signature 62 is a form of cryptographic protection of the delegation artifact 52

Rate limits and concurrency constraints can include, for example, a maximum number of invocation requests within a duration of time. Risk summary data can include references to a fidelity score class and integrity score class, which may be expressed as discrete bands instead of raw values. Any of the data in the delegation artifact 52 may be cryptographically protected using any type of encryption, for example, the AI Agent identifier 54 may be hashed.

It is contemplated by the present disclosure, that the data in the delegation artifact 52 constitutes least-privilege authorization constraints. Thus, the delegation artifact 52 encodes least-privilege permissions of the autonomous AI agent required to invoke a tool or API. As described herein, least-privilege permissions are only those permissions necessary to perform a permitted action, for example, requesting to invoke a tool.

It is contemplated by the present disclosure that relying systems may validate delegation artifacts 52 using a known public key or shared trust anchor associated with the authorization software. The relying systems need not have access to raw behavioral modalities, model parameters, or integrity computation details. Rather, relying systems may verify that a delegation artifact 52 is validly signed, unexpired, and within a time-to-live. Moreover, relying systems may verify that the scope 58 of the delegation artifact 52 permits a requested action, and that optional runtime bindings match the execution context. Doing so reduces integration friction and enables consistent enforcement across heterogeneous tool surfaces.

Heterogeneous tool surfaces include, for example, SaaS, APIs, cloud control planes, internal microservices, and end-point automation systems. It is contemplated by the present disclosure that sector-specific constraints may be enforced while maintaining low-latency authorization suitable for high-frequency agentic tool invocation. Such constraints include, for example, payment limits, restricted data access, and audit requirements.

If it is determined that the fidelity signal and/or integrity signal fails to satisfy their respective thresholds, a tool invocation request may be denied. Alternatively, a delegation artifact 52 may be modified by down-scoping permitted actions, reducing resource scope, shortening TTL, applying stricter rate limits, or routing tool invocations to a sandbox tier of tools. Examples of down-scoped permitted actions include, for example, allowing read-only actions and deny-ing write actions. It is contemplated by the present disclo-sure that a step-up approval flow may be implemented that requires explicit approval by the person prior to issuing a delegation artifact 52 for high-risk actions.

Figure 5:
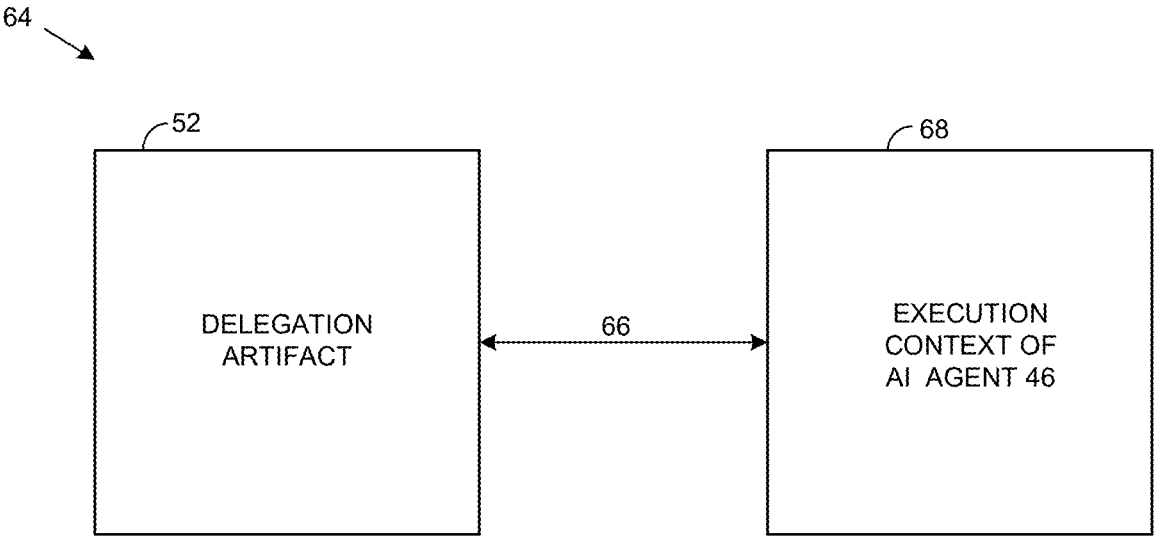
FIG. 5 is a simplified block diagram illustrating a bond between the delegation artifact and an example execution context of the autonomous AI agent.

FIG. 5 is a simplified block diagram 64 illustrating a bond 66 between the delegation artifact 52 and an execution context 68 of the autonomous AI agent 46. The bond 66 can be, for example, a binding value that is derived from or based on one or more of an attested runtime identity of the execution environment, a software supply chain measure-ment, a model identifier or model measurement, and a session nonce, a request nonce, or a challenge-response value. The binding value may be derived by hashing, sign-ing, or otherwise cryptographically securing the attested runtime identity of the execution environment, the software supply chain measurement, the model identifier or model measurement, and the session nonce, the request nonce, or the challenge-response value.

An attested runtime identity of the execution environment may include, for example, a workload identity, a container identity, trusted execution environment evidence, and a signed measurement. A software supply chain measurement may include, for example, a container image hash, binary hash, or software bill of materials (SBOM) hash. The model identifier or model measurement may include, for example, model version identifier or model-weights hash. The nonce, session nonce, request nonce, challenge-response value, and session-bound value may be used to facilitate preventing replay or unauthorized use. The nonce, session nonce, request nonce, challenge-response value, and session-bound value are each associated with at least one of the request or the person to whom the AI Agent is bound.

As described herein, execution context refers to runtime attributes describing where and how a particular autono-mous AI agent instance executes at the time of authorization, including an identity of a workload or process and one or more runtime measurements. For example, execution con-text attributes may include a model identifier and/or model measurement and may also include a container/VM/work-load identity and software supply chain measurements. Examples of model identifiers and/or model measurements include, but are not limited to, a model version, model digest, or model-weights measurement.

Example instances of the AI agent 46 include a workload identity, a container identity, a virtual machine identity, a serverless identity, code and model measurements, and session bindings, nonce bindings, and timestamp bindings. The delegation artifact 52 may be bound 66 to one or more execution contexts. The execution environment is part of the execution context.

As described herein, attestation evidence refers to cryp-tographic evidence used to prove one or more execution-context attributes. Examples of cryptographic evidence include, but are not limited to, signed measurements or quotes. Binding 66 the delegation artifact 52 and the execu-tion context 68 facilitates reducing the likelihood that an attacker will steal and replaying the delegation artifact 52 from a different electronic device, container, model, or hijacked agent for which the delegation artifact 52 was not issued.

Attestation evidence can be obtained from an attestation verifier or from the execution environment. One or more hashes or digital signatures derived from the attestation evidence can be included in the delegation artifact 52. A relying system can validate the digital signature and confirm that runtime binding information matches the observed execution context prior to honoring a requested invocation.

Computer systems commonly rely on identity and access management (IAM) controls to authenticate people and to authorize them to access protected resources. Traditional IAM controls were designed principally for people who authenticate via credentials, multi-factor authentication, and/or biometric signals, and who then receive a token or other authorization artifact enabling access to the protected resources for a period of time. These approaches often assume that a person remains the acting principal while the protected resources are being accessed, and the set of actions performed while accessing the resources will be limited by human speed, attention, and operational constraints.

In parallel, software automation has increasingly used artifacts like non-human identities, Internet of things (IoT) services, service accounts, and machine-to-machine tokens to enable programmatic access to resources. Such artifacts are typically provisioned and governed through static per-missions, fixed scopes, and predetermined lifetimes. How-ever, using such artifacts to enable programmatic access to protected resources has been known to result in over-privileged, difficult to right-size, and slow to adapt to dynamic risk conditions, resulting in standing privileges that may be abused if compromised.

Autonomous artificial intelligence agents introduce a fun-damentally different operational profile. An artificial intel-ligence agent may be configured to plan, decide, and execute actions with limited human supervision, including invoking tools and external services to complete tasks. Such agents may operate at speeds and scales that exceed human capa-bilities, may initiate parallel action sequences, and may dynamically alter plans based on intermediate tool outputs or even instant code creation and manipulation, to gain access to systems and services. As a result, compromise or manipulation of an agent can enable rapid and high-impact abuse of protected resources.

Artificial intelligence agents are typically bound to a certain person and act on behalf of that person. However, it is known that artificial intelligence agents can be subverted such that the agent is no longer reliably acting on behalf of the person. For example, interception, replay, imperson-ation, account takeover, session hijacking, or other adver-sarial influence can cause the agent to diverge from the behavioral patterns of the person to whom it is bound. It is also known that an artificial agent's execution behavior may become abnormal or adversarial even if the agent remains bound to the person. For example, prompt injection, tool output manipulation, tampering with tool invocation sequences, unauthorized expansion of resource scope, or malicious automation routines can cause the agent to perform unsafe or unauthorized tool calls.

Known approaches can attempt to mitigate risks associated with AI Agents being subverted or otherwise malfunctioning by applying authentication at the beginning of a session, constraining tool access through static scopes and permissions, or requiring additional step-up authentication for selected sensitive actions. However, such approaches may not be adequate for agentic operation because a single authentication event does not continuously reflect whether the agent remains faithfully bound to the person over time, static permissioning does not adapt to rapidly changing risk conditions or evolving agent plans, and step-up prompts can be bypassed, delayed, or become operationally impractical when an agent executes many actions across multiple systems singularly or simultaneously.

To address these problems the electronic device 10 can receive a request from an autonomous artificial intelligence agent operating in the electronic device 10. The request can be for invoking a tool associated with a protected resource. The autonomous artificial intelligence agent is behaviorally bound to a person. The electronic device 10 may obtain a fidelity signal and an integrity signal. The fidelity signal is indicative of whether the autonomous artificial intelligence agent is behaviorally bound to the person and the integrity signal is indicative of whether execution behavior of the autonomous artificial intelligence agent is within a range expected for using the requested tool. Moreover, the electronic device 10 can determine whether the request satisfies one or more policy rules at an authorization checkpoint based on at least one of the fidelity signal, the integrity signal and a context associated with the request. In response to determining that the request satisfies the one or more policy rules, the electronic device 10 can generate a delegation artifact. The delegation artifact is machine-verifiable and encodes least-privilege authorization constraints including at least a permitted action type, a scope, and a bounded validity interval. The electronic device 10 can effect the tool invocation request based on the delegation artifact.

FIG. 6 is a diagram illustrating an example method and algorithm for authorizing invocation of a tool by an autonomous AI Agent according to an embodiment of the present disclosure. FIG. 6 illustrates example steps performed when the electronic device 10 runs software 38 stored in the memory 18 to authorize invocation of a tool by an autonomous AI agent.

In step S1, the software 38 executed by the processor 16 causes the electronic device 10 to receive a request from an autonomous AI agent operating in the electronic device 10. As described herein, the AI Agent is a software entity configured to, for example, generate plans, select actions, and invoke tools or application programming interfaces (API). The AI Agent may be, for example, the AI Agent 46 and may be behaviorally bound to the person as described herein with regard to FIG. 3. The request can be for invoking a tool associated with a protected resource. The AI agent operates within an execution environment of the electronic device 10 and generates execution signals while executing capabilities on behalf of the person 44.

In step S2, the software 38 executed by the processor 16 causes the electronic device 10 to obtain a fidelity score indicative of whether the autonomous AI Agent is bound to the person. The fidelity score may be derived from behavioral modality data, baseline persona modeling, and/or continuous evaluation techniques and facilitates determining whether an AI Agent has been subverted or is otherwise malfunctioning.

Next, in step S3, the software 38 executed by the processor 16 causes the electronic device 10 to obtain an integrity score indicative of whether execution behavior of the autonomous AI agent is within a range expected for using the requested tool. The behavior can include, for example, evaluation of tool invocation patterns, resource scope changes, timing patterns, semantic alignment between plans and outputs, and/or other integrity scores. The integrity score also facilitates determining whether an AI Agent has been subverted or is otherwise malfunctioning.

In step S4, the software 38 executed by the processor 16 causes the electronic device 10 to determine whether the request satisfies one or more policy rules at an authorization checkpoint based on at least one of the fidelity signal, the integrity signal and a context associated with the request. For example, an authorization risk score R may be calculated according to the equation $R=w\_f\cdot(1-F)+w\_i\cdot(1-I)+w\_c\cdot C$, in which F is a fidelity score, I is an integrity score, C is a contextual value, $w\_f$, $w\_i$, and $w\_c$ are weights. The contextual value may reflect a degree of risk associated with the request. The weights may vary depending on the tool requested to be invoked. The authorization risk score R may be compared against a threshold value T. The threshold value T may be selected based on the requested tool, the permitted action, the requested scope, the resource type, the risk level, or other request context. When the authorization risk score R satisfies the threshold value T, the software 38 executed by the processor 16 can cause the electronic device 10 to determine that the request satisfies the one or more policy rules.

In response to determining that the request satisfies the one or more policy rules, in step S5, the software 38 executed by the processor 16 causes the electronic device 10 to generate a delegation artifact that is machine verifiable and encodes least-privilege authorization constraints including, for example, a permitted action type, a scope, and a bounded validity interval. The delegation artifact may be, for example, the delegation artifact 52 described herein with regard to FIG. 4. Next, in step S6, the software 38 executed by the processor 16 causes the electronic device 10 to decide the AI Agent is permitted to invoke the requested tool and thus to effect the tool invocation request based on the delegation artifact.

When the request fails to satisfy the one or more policy rules, in step S7, the software 38 executed by the processor 16 causes the electronic device 10 to deny the tool invocation request. Alternatively, the software 38 executed by the processor 16 can cause the electronic device 10 to modify the delegation artifact 52 or generate a new delegation artifact 52 by down-scoping permitted actions, reducing resource scope, shortening TTL, applying stricter rate limits, or routing tool invocations to a sandbox tier of tools. Examples of down-scoped permitted actions include, for example, allowing read-only actions and denying write actions. It is contemplated by the present disclosure that a step-up approval flow may be implemented that requires explicit approval by the person prior to issuing a delegation artifact 52 for high-risk actions.

The threshold value may be satisfied when authorization risk score R is less than or equal to the threshold value. Other threshold values may be satisfied when the authorization risk score R score is equal to or greater than the threshold value.

Alternatively, the threshold value may include multiple threshold values, each of which is required to be satisfied to satisfy the threshold value.

It is contemplated by the present disclosure that AI Agent constraints may be dynamically or otherwise modified in response to changing risk signals. For example, if a fidelity signal degrades over time or integrity signal anomalies are detected, the software 38 executed by the processor 16 may cause the electronic device 10 to refuse to issue new delegation artifacts 52, to issue reduced-scope delegation artifacts 52, and/or instruct relying systems to invalidate prior delegation artifacts 52. Prior delegation artifacts 52 may be invalidated by publishing revocation indicators or updating verification policy rules. Additionally, or alternatively, previously issued delegation artifacts 52 may be intentionally short-lived so that revocation occurs naturally through expiration, which reduces the reliance on explicit revocation mechanisms. As described herein, short-lived indicates that the bounded validity interval is selected to expire within seconds or minutes and is shorter than a session duration, thereby limiting reuse and reducing replay risk.

Although the example method and algorithm described herein calculates and compares an authorization risk score R against the threshold value to determine whether the request satisfies one or more policy rules at an authorization checkpoint, it is contemplated by the present disclosure that the determination may be made in any additional, or alternative manner. For example, a tool-call burstiness value may be calculated using a moving time window or an exponentially weighted moving average (EWMA) of call rate, and may be compared against the threshold value for the requested tool or permitted action. As another example, a plan/output divergence may be calculated using cosine distance between vector embeddings of an intended plan and a generated output. The plan/output divergence may be compared against another threshold to detect anomalous behavior. The other threshold value may be selected based on one or more of the requested tool, a permitted action, requested scope, resource type, risk level, or other request context.

The plan can be a representation of what the AI agent intends to do before or while invoking a tool. For example, a plan can be a structured sequence of steps, a tool-call plan, a policy-constrained plan, and/or a condensed textual plan. A tool call plan may be an ordered list of tool invocations and argument templates. The output can be a representation of what the agent actually produces or executes. For example, the output can be intermediate and/or final agent responses, tool outputs or results, and/or a post-action summary of what occurred. The output can also be a realized tool invocations and arguments, and summaries of the tool invocations and arguments. Divergence measures whether what the agent did semantically aligns with what the agent intended or was permitted to do. A large divergence may indicate fraud via prompt injection, tool manipulation, or compromised planning/execution.

As yet another example, the plan/output divergence may be evaluated by comparing an intended plan representation and an output representation. The intended plan may include a structured or unstructured representation of one or more planned steps or tool invocations selected by the autonomous AI agent prior to execution, including planned tool identifiers, ordered steps, and/or anticipated arguments, optionally constrained by policy. The output may include a structured or unstructured representation of one or more executed steps, tool invocations, tool arguments, returned results, and/or an agent-generated summary produced during or after execution.

As yet another example, vector embeddings can be computed for an intended plan and the output, a divergence value is computed using cosine distance or another similarity metric. The divergence value is compared against yet another threshold value to detect anomalous behavior. The yet another threshold value may be selected based on one or more of the requested tool, a permitted action, requested scope, resource type, risk level, or other request context.

Using the methods and algorithms for authorizing invocation of a tool by an autonomous AI Agent as described herein enables reliably and efficiently enforcing least-privilege action constraints of autonomous AI Agents while maintaining trust in both the person-agent bond and the integrity of the execution behavior of the artificial intelligence agent. As a result, compromise and/or manipulation of AI Agents is facilitated to be reduced which enhances reducing replay, cloning, and transfer of authority to a different agent instance or unauthorized party, and thus enhances the security of protected resources against subverted or otherwise malfunctioning AI Agents.

It is contemplated by the present disclosure that the example methods and algorithms described herein may be conducted entirely by the electronic device 10, partly by the electronic device 10 and partly by the server 12, entirely by the server 12, or by any other combination of other servers (not shown), electronic devices (not shown), or computers (not shown) operable to communicate with the electronic device 10 via the network 14. Furthermore, data described herein as being stored in the electronic device 10 may alternatively, or additionally, be stored in any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for authorizing invocation of a tool by an autonomous artificial intelligence agent, the method comprising the steps of:

receiving, by an electronic device, a request from an autonomous artificial intelligence agent operating in the electronic device, the request for invoking a tool associated with a protected resource, the autonomous artificial intelligence agent being behaviorally bound to a person;

obtaining a fidelity signal, the fidelity signal being indicative of whether the autonomous artificial intelligence agent is behaviorally bound to the person;

obtaining an integrity signal, the integrity signal being indicative of whether execution behavior of the autonomous artificial intelligence agent is within a range expected for using the requested tool;

determining whether the request satisfies one or more policy rules at an authorization checkpoint based on at least one of the fidelity signal, the integrity signal and a context associated with the request;

in response to determining that the request satisfies the one or more policy rules, generating a delegation artifact, the delegation artifact being machine-verifiable and encoding least-privilege authorization constraints including at least a permitted action type, a scope, and a bounded validity interval; and effecting the tool invocation request based on the delegation artifact.

2. The method according to claim 1, said determining step comprising:

determining the fidelity signal indicates that the autonomous artificial intelligence agent is behaviorally bound to the person;

determining the integrity signal indicates the execution behavior of the autonomous artificial intelligence agent is within the expected range; and determining the context of the request by determining at least one of a tool identifier, an action type, a resource identifier, a requested scope, a session nonce, and an execution context.

3. The method according to claim 1, wherein the scope comprises at least one of:

a tool scope;

an application programming interface endpoint scope;

a function scope;

a resource scope;

a tenant scope;

an object scope; and an account scope.

4. The method according to claim 1, wherein the least-privilege authorization constraints further comprise at least one of:

a rate limit;

a concurrency limit;

a maximum number of invocations;

a maximum data access volume;

a transaction constraint; and a side-effect limit.

5. The method according to claim 1, wherein the bounded validity interval comprises a time-to-live that is less than a session duration of the autonomous artificial intelligence agent, said method further comprising issuing the delegation artifact per tool invocation or per short authorization window.

6. The method of claim 1, in response to determining that the request fails to satisfy the one or more policy rules, said method comprises:

denying the request; or generating a constrained delegation artifact that reduces at least one of the permitted action type, the scope, or the bounded validity interval relative to the request.

7. The method of claim 1 further comprising cryptographically binding the delegation artifact to an execution context of the autonomous artificial intelligence agent.

8. The method according to claim 7 further comprising including, in the delegation artifact, a hash or digital signature derived from attestation evidence of a runtime environment executing the autonomous artificial intelligence agent.

9. The method according to claim 1, further comprising including, in the delegation artifact, a nonce, challenge-response value, or session-bound value associated with at least one of the request or the intended person to prevent replay of the delegation artifact.

10. An electronic device for authorizing invocation of a tool by an autonomous artificial intelligence agent comprising:

a processor; and a memory configured to store data, said electronic device being associated with a network and said memory being in communication with said processor and having instructions stored thereon which, when read and executed by said processor, cause said electronic device to:

receive a request from an autonomous artificial intelligence agent operating in the electronic device, the request for invoking a tool associated with a protected resource, the autonomous artificial intelligence agent being behaviorally bound to a person;

obtain a fidelity signal, the fidelity signal being indicative of whether the autonomous artificial intelligence agent is behaviorally bound to the person;

obtain an integrity signal, the integrity signal being indicative of whether execution behavior of the autonomous artificial intelligence agent is within a range expected for using the requested tool;

determine whether the request satisfies one or more policy rules at an authorization checkpoint based on at least one of the fidelity signal, the integrity signal and a context associated with the request;

in response to determining the request satisfies the one or more policy rules, generate a delegation artifact, the delegation artifact being machine-verifiable and encoding least-privilege authorization constraints including at least a permitted action type, a scope, and a bounded validity interval; and effect the tool invocation request based on the delegation artifact.

11. The electronic device according to claim 10, wherein the instructions when read and executed by said processor, further cause said electronic device to:

determine the fidelity signal indicates that the autonomous artificial intelligence agent is behaviorally bound to the person;

determine the integrity signal indicates the execution behavior of the autonomous artificial intelligence agent is within the expected range; and determine the context of the request by determining at least one of a tool identifier, an action type, a resource identifier, a requested scope, a session nonce, and an execution context.

12. The electronic device according to claim 10, wherein the scope comprises at least one of:

a tool scope;

an application programming interface endpoint scope;

a function scope;

a resource scope;

a tenant scope;

an object scope; and an account scope.

13. The electronic device according to claim 10, wherein the least-privilege authorization constraints further comprise at least one of:

a rate limit;

a concurrency limit;

a maximum number of invocations;

a maximum data access volume;

a transaction constraint; and a side-effect limit.

14. The electronic device according to claim 10, wherein the bounded validity interval comprises a time-to-live that is less than a session duration of the autonomous artificial intelligence agent and the instructions when read and executed by said processor, further cause said electronic device to issue the delegation artifact per tool invocation or per short authorization window.

15. The electronic device according to claim 10, wherein the instructions when read and executed by said processor, in response to determining that the request fails to satisfy the one or more policy rules, further cause said electronic device to:

deny the request; or generate a constrained delegation artifact that reduces at least one of the permitted action type, the scope, or the bounded validity interval relative to the request.

16. The electronic device according to claim 10, wherein the instructions when read and executed by said processor further cause said electronic device to cryptographically bind the delegation artifact to an execution context of the autonomous artificial intelligence agent.

17. The electronic device according to claim 16, wherein the instructions when read and executed by said processor further cause said electronic device to include, in the delegation artifact, a hash or digital signature derived from attestation evidence of a runtime environment executing the autonomous artificial intelligence agent.

18. The electronic device according to claim 10, wherein the instructions when read and executed by said processor further cause said electronic device to include, in the delegation artifact, a nonce, challenge-response value, or session-bound value associated with at least one of the request or the intended person to prevent replay of the delegation artifact.

19. A non-transitory computer-readable recording medium in an electronic device for authorizing invocation of a tool by an autonomous artificial intelligence (AI) agent, the non-transitory computer-readable recording medium storing instructions which when executed by a hardware processor cause the hardware processor to perform steps comprising:

receiving a request from an autonomous artificial intelligence agent operating in the electronic device, the request for invoking a tool associated with a protected resource, the autonomous artificial intelligence agent being behaviorally bound to a person;

obtaining a fidelity signal, the fidelity signal being indicative of whether the autonomous artificial intelligence agent is behaviorally bound to the person;

obtaining an integrity signal, the integrity signal being indicative of whether execution behavior of the autonomous artificial intelligence agent is within a range expected for using the requested tool;

determining whether the request satisfies one or more policy rules at an authorization checkpoint based on at least one of the fidelity signal, the integrity signal and a context associated with the request;

in response to determining the request satisfies the one or more policy rules, generating a delegation artifact, the delegation artifact being machine-verifiable and encoding least-privilege authorization constraints including at least a permitted action type, a scope, and a bounded validity interval; and effecting the tool invocation request based on the delegation artifact.

20. The non-transitory computer-readable recording medium according to claim 19, wherein the instructions when read and executed by said processor, further cause the hardware processor to perform the steps comprising:

determining the fidelity signal indicates that the autonomous artificial intelligence agent is behaviorally bound to the person;

determining the integrity signal indicates the execution behavior of the autonomous artificial intelligence agent is within the expected range; and determining the context of the request by determining at least one of a tool identifier, an action type, a resource identifier, a requested scope, a session nonce, and an execution context claim.

* * * * *